(12) United States Patent
Lee et al.

(10) Patent No.: US 8,919,704 B2
(45) Date of Patent: Dec. 30, 2014

(54) CONDUIT HANGER AND SUPPORT APPARATUS

(71) Applicants: Charles Lee, Commerce Township, MI (US); Elio Evangelista, Chesterfield, MI (US); Paul Burke, Commerce, MI (US)

(72) Inventors: Charles Lee, Commerce Township, MI (US); Elio Evangelista, Chesterfield, MI (US); Paul Burke, Commerce, MI (US)

(73) Assignee: A. Raymond et Cie, Grenoble (FR)

( * ) Notice: Subject to any disclaimer, the term of this patent is extended or adjusted under 35 U.S.C. 154(b) by 13 days.

(21) Appl. No.: 13/748,656

(22) Filed: Jan. 24, 2013

(65) Prior Publication Data

US 2014/0175230 A1    Jun. 26, 2014

Related U.S. Application Data

(60) Provisional application No. 61/745,087, filed on Dec. 21, 2012.

(51) Int. Cl.
*F16L 3/08* (2006.01)
*F16L 3/26* (2006.01)

(52) U.S. Cl.
CPC ........................ *F16L 3/26* (2013.01)
USPC ................... 248/62; 248/58; 248/61; 248/63; 248/74.1; 248/74.2; 248/74.3

(58) Field of Classification Search
USPC ........... 248/58, 61, 62, 63, 65, 69, 70, 72, 73, 248/74.1, 74.2, 74.3
See application file for complete search history.

(56) References Cited

U.S. PATENT DOCUMENTS

| | | | | | |
|---|---|---|---|---|---|
| 215,510 | A | * | 5/1879 | Davis | 193/6 |
| 391,605 | A | * | 10/1888 | Hall | 248/61 |
| 564,433 | A | * | 7/1896 | Lewis | 248/61 |
| 1,255,219 | A | * | 2/1918 | Pedersen | 248/60 |
| 1,369,828 | A | * | 3/1921 | Matthews | 248/61 |
| 1,936,079 | A | * | 11/1933 | Belding | 405/121 |
| 1,986,861 | A | * | 1/1935 | Starr | 248/62 |
| 2,161,782 | A | * | 6/1939 | Flower | 248/59 |
| 2,324,181 | A | * | 7/1943 | Tulien | 138/161 |
| 2,646,818 | A | * | 7/1953 | Bimpson | 137/377 |
| 2,812,380 | A | * | 11/1957 | Lehrke | 174/41 |
| 3,173,638 | A | * | 3/1965 | Neale, Sr. | 248/61 |
| 3,194,590 | A | * | 7/1965 | Cook | 285/61 |

(Continued)

OTHER PUBLICATIONS

Raywal, BIS Pipe Reinforcement Scale—K 3 05 (EN-US), www.walranven.com/us/en, 1 page (Dec. 2012).

(Continued)

*Primary Examiner* — Nkeisha Smith
(74) *Attorney, Agent, or Firm* — Harness, Dickey & Pierce, P.L.C.

(57) ABSTRACT

A support assembly for supporting a conduit includes a support, a clamp, and a hanger. The support has a partial-cylindrical shape including a first section having a first diameter and a second section having a second diameter that is greater than the first diameter. In one aspect, at least one of the first section and the second section define a first aperture in the partial-cylindrical shape. In another aspect, at least one of the first section and the second section includes a retention member extending radially from an outer surface of the partial-cylindrical shape. The retention member includes a closed loop or a partially-open loop that defines a second aperture for receiving a strap to secure the conduit to the support. The clamp is configured to secure the conduit to the support. The hanger is configured to suspend the support from a structure.

22 Claims, 9 Drawing Sheets

(56) References Cited

U.S. PATENT DOCUMENTS

| | | | |
|---|---|---|---|
| 3,530,899 A * | 9/1970 | Breeding | 138/107 |
| 3,539,137 A * | 11/1970 | March | 248/62 |
| 3,653,618 A * | 4/1972 | Kindorf et al. | 248/58 |
| 3,716,650 A * | 2/1973 | de Mecquenem | 174/42 |
| 3,809,348 A | 5/1974 | Di Laura | |
| 3,810,490 A * | 5/1974 | Ludwick | 138/106 |
| 3,933,377 A * | 1/1976 | Arrowood | 285/61 |
| 3,965,938 A * | 6/1976 | Bauerle et al. | 138/107 |
| 4,006,874 A * | 2/1977 | McGee | 248/74.3 |
| 4,146,203 A * | 3/1979 | Williams | 248/62 |
| 4,185,802 A | 1/1980 | Myles et al. | |
| 4,252,289 A | 2/1981 | Herb | |
| 4,266,745 A * | 5/1981 | Jones | 248/58 |
| 4,403,758 A * | 9/1983 | Burt | 248/49 |
| 4,413,799 A | 11/1983 | Gabriel | |
| 4,684,086 A | 8/1987 | Fetsch | |
| 4,709,888 A | 12/1987 | Cubit et al. | |
| 4,765,577 A * | 8/1988 | Collins et al. | 248/59 |
| 4,905,939 A * | 3/1990 | Horn | 248/49 |
| 4,911,388 A * | 3/1990 | Unger et al. | 248/74.3 |
| 5,005,789 A * | 4/1991 | Jones | 248/58 |
| 5,067,679 A * | 11/1991 | Courtney | 248/75 |
| 5,192,039 A * | 3/1993 | Williams | 248/62 |
| 5,344,108 A | 9/1994 | Heath | |
| 5,544,849 A * | 8/1996 | Peterson et al. | 248/74.1 |
| 5,755,542 A * | 5/1998 | Janusz et al. | 411/387.4 |
| 6,032,700 A * | 3/2000 | Macedone | 138/110 |
| 6,135,398 A | 10/2000 | Quesnel | 248/74.1 |
| 6,224,025 B1 * | 5/2001 | Alvarez | 248/58 |
| 6,241,199 B1 * | 6/2001 | Ismert | 248/56 |
| 6,254,040 B1 | 7/2001 | McGrath | |
| 6,283,158 B1 * | 9/2001 | Botsolas et al. | 138/110 |
| 6,402,096 B1 | 6/2002 | Ismert et al. | |
| 6,609,343 B1 | 8/2003 | Litten | |
| 6,691,742 B1 * | 2/2004 | Cooper | 138/106 |
| 6,959,898 B1 * | 11/2005 | Laughlin et al. | 248/60 |
| 7,422,181 B2 * | 9/2008 | Süßenbach | 248/56 |
| 7,677,505 B2 * | 3/2010 | Deichman | 248/58 |
| 7,740,211 B2 * | 6/2010 | Dukes | 248/74.4 |
| 7,744,041 B2 | 6/2010 | Boudreau et al. | |
| 7,770,341 B2 | 8/2010 | Fox | |
| 7,997,541 B2 * | 8/2011 | Pothanikat et al. | 248/74.1 |
| 8,038,105 B2 * | 10/2011 | Deichman | 248/58 |
| 8,061,390 B2 | 11/2011 | Condon et al. | |
| 8,074,943 B2 | 12/2011 | Boudreau et al. | |
| 8,256,800 B2 | 9/2012 | Ward | |
| 8,297,561 B1 * | 10/2012 | Montplaisir et al. | 248/58 |
| 2003/0080260 A1 * | 5/2003 | Buck | 248/58 |
| 2006/0138286 A1 | 6/2006 | Connolly | 248/62 |
| 2008/0116324 A1 | 5/2008 | Holder | 248/65 |
| 2008/0203239 A1 * | 8/2008 | Deichman | 248/58 |
| 2009/0032650 A1 | 2/2009 | Maehara et al. | |
| 2009/0078832 A1 * | 3/2009 | McIntosh | 248/61 |
| 2010/0140420 A1 * | 6/2010 | Deichman | 248/58 |
| 2012/0001033 A1 * | 1/2012 | Wilde et al. | 248/73 |
| 2012/0160970 A1 * | 6/2012 | Bragagna et al. | 248/62 |
| 2013/0075540 A1 * | 3/2013 | Hammond et al. | 248/62 |

OTHER PUBLICATIONS

Raywal, BIS Pipe Reinforcement Scale Assembly Instruction, 1 page, www.walraven.com/us/en (Jul. 2012).

Raywal, BIS Pipe Reinforcement Scale Brochure, 2 pages, www.walraven.com/us/en (Jul. 2012).

Raywal, BIS Pipe Reinforcement Scale Data Sheet, 1 page, www.walraven.com/us/en (Mar. 2013).

Rayway, PexStraight Data Sheet, 1 page, www.walraven.com/en/us (Jul. 2012).

* cited by examiner

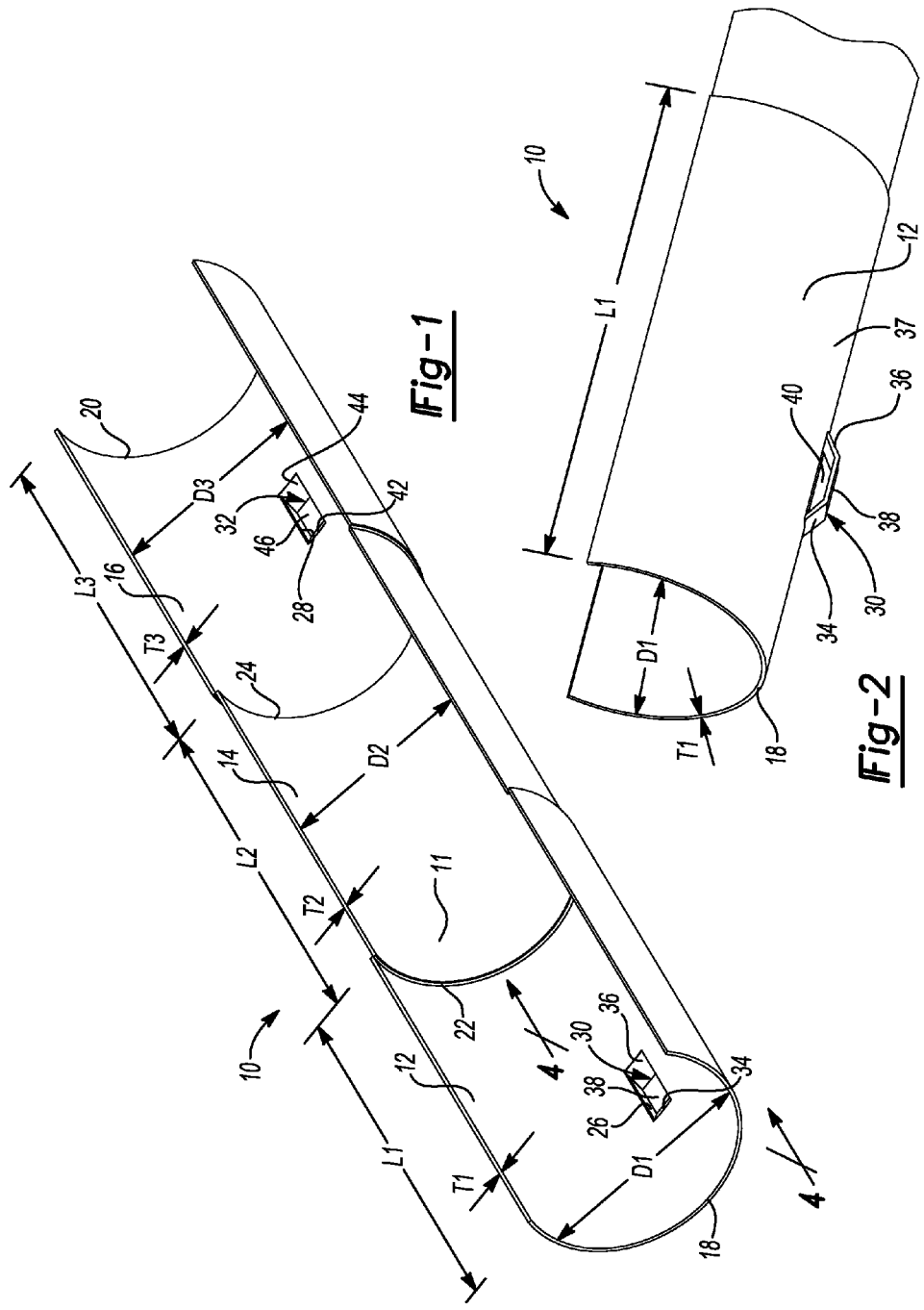

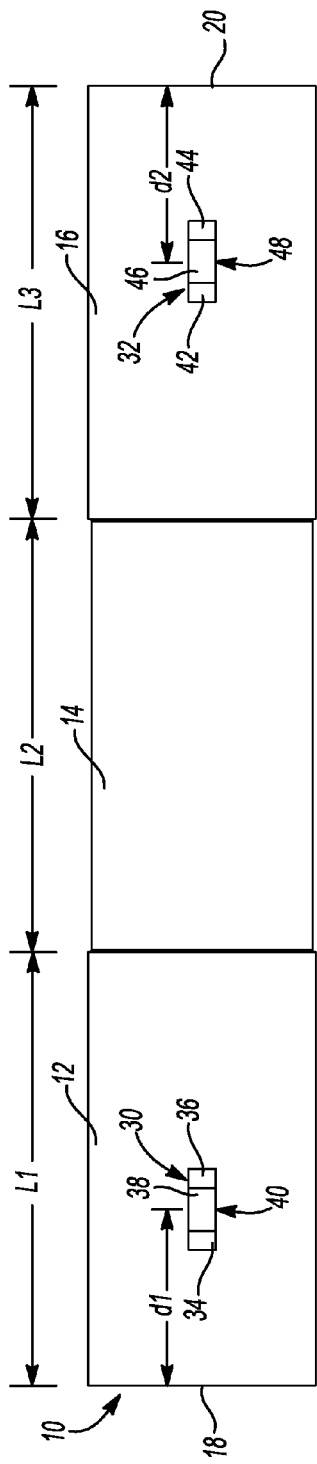
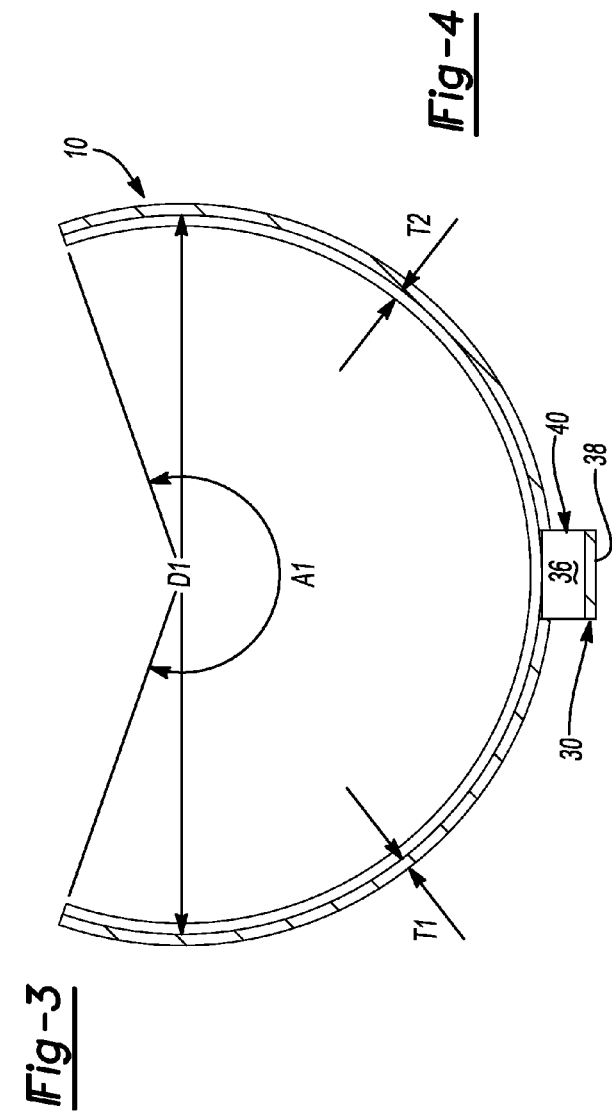

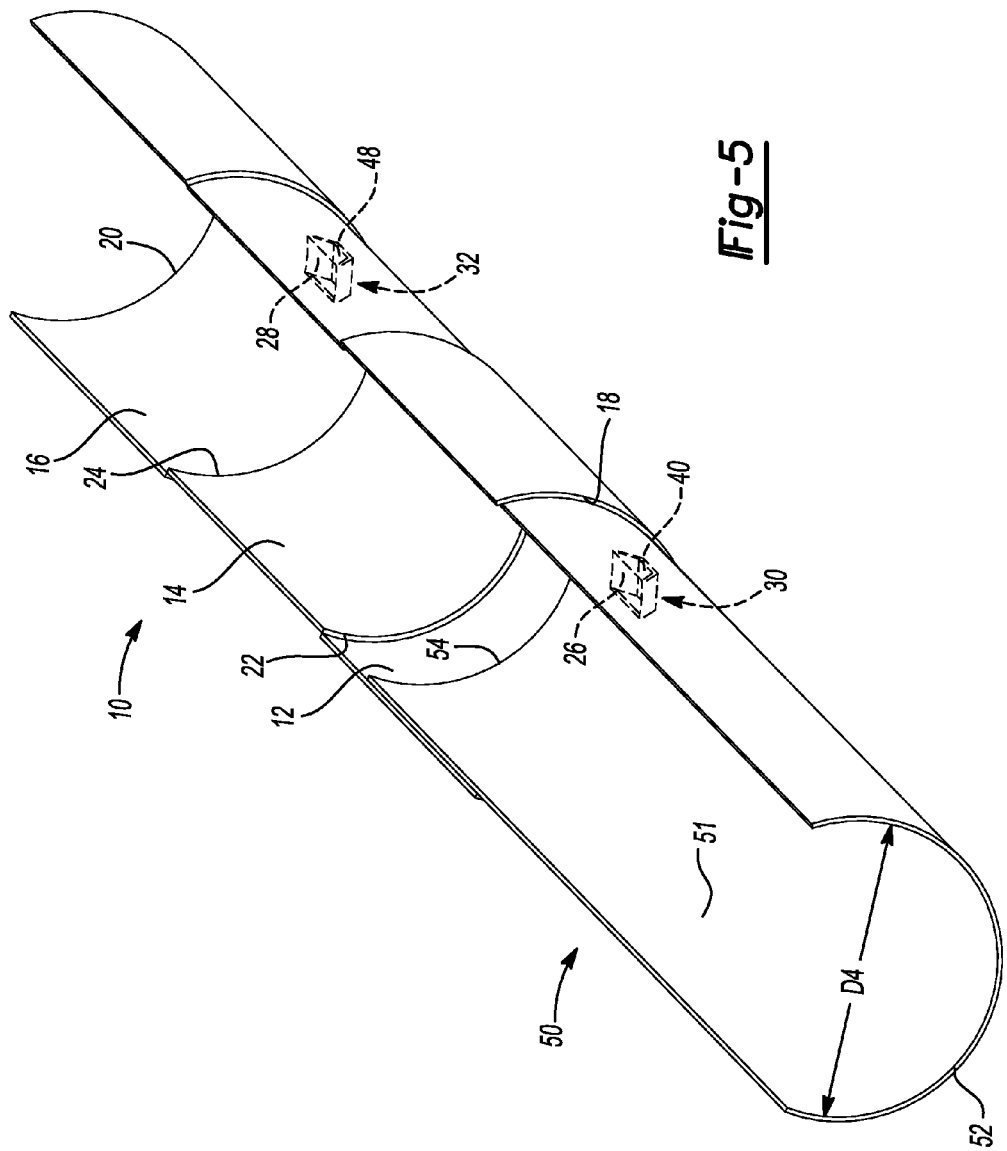

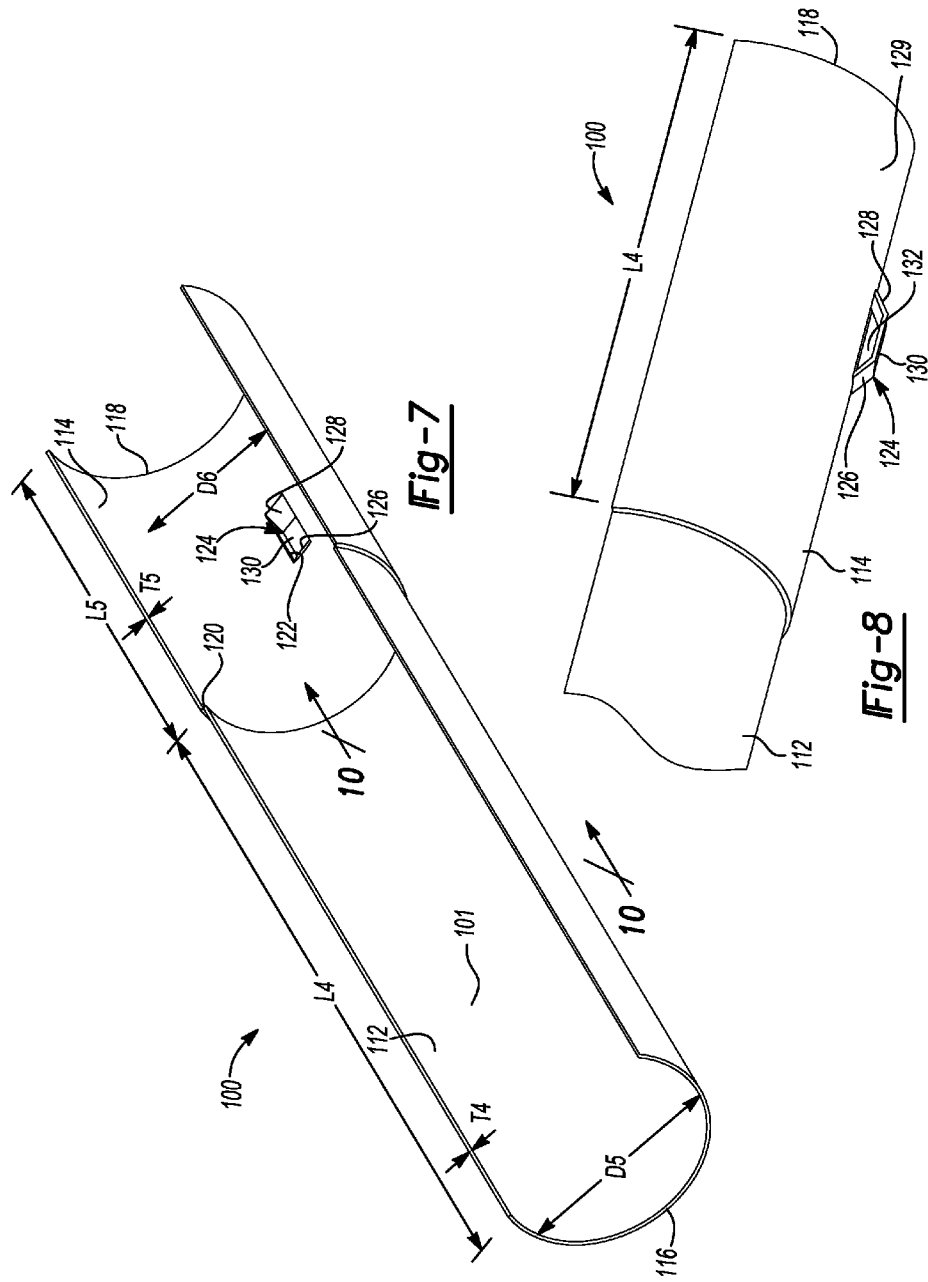

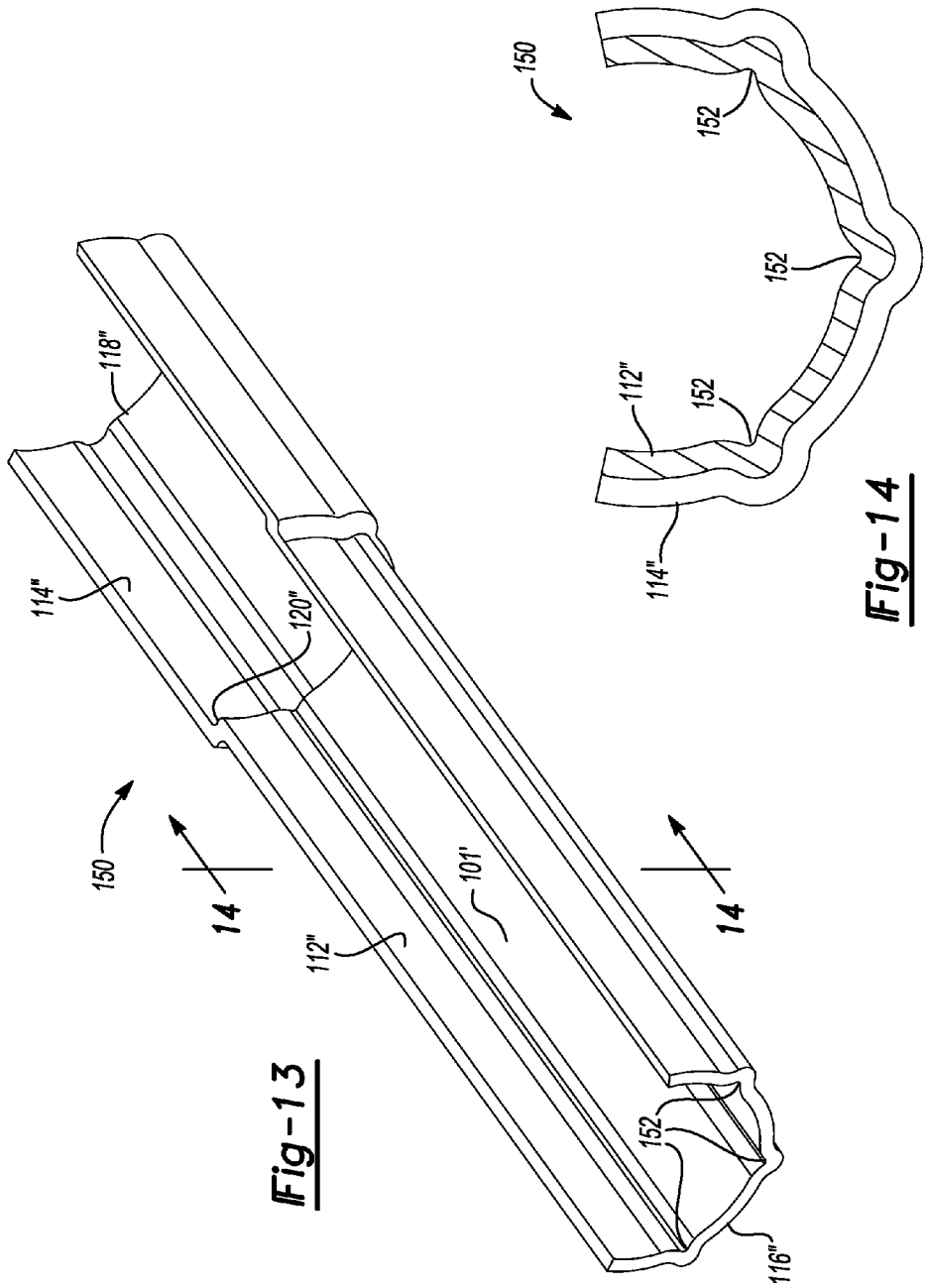

CONDUIT HANGER AND SUPPORT APPARATUS

CROSS-REFERENCE TO RELATED APPLICATIONS

This application claims the benefit of U.S. Provisional Application No. 61/745,087, filed on Dec. 21, 2012. The entire disclosure of the above application is incorporated herein by reference.

BACKGROUND AND SUMMARY

The present disclosure relates to hanger and support assemblies for supporting conduit including fluid pipes and electrical conduit.

Hanger and support assemblies are used to support conduit by, for example, suspending the conduit from structure such as a ceiling in settings such as a parking garage. Hanger and support assemblies can include a support that supports the conduit and a clamp or hanger that mounts the support to the structure and secures the conduit to the support. Typically, the support has a hollow, hemi-cylindrical body configured to receive the conduit, and the hanger is configured to extend around the conduit and the support. In addition, two hangers are typically used for each support, with a hanger positioned near each end of the support.

Although the conduit is secured to the support at the locations of the hangers, portions of the conduit between the hangers may detach from the support. Friction between the conduit and the support may retain the conduit on the support to some degree. However, conduit such as plastic pipe has a tendency to bend, which causes the conduit to resist retention in the support. In addition, thermal expansion and contraction of the conduit can cause the conduit to detach from the support. Thus, factors such as shape memory and thermal expansion may cause portions of conduit between the hangers to overcome friction between the conduit and the support and detach from the support.

To prevent detachment of the conduit from the support, zip ties can be wrapped around the conduit and the support. However, assembling the zip ties requires two hands. Since the zip ties are often placed by a worker positioned on a ladder or other elevated platform, requiring two hands to assemble the zip ties can increase risk of injury. In addition, positioning the zip ties at regular intervals along the length of the support is difficult.

Furthermore, supports may be have relatively large lengths, such as 10 feet (ft), to reduce the number of supports required to support a given length of conduit. However, a standard shipping container may be configured to contain supports having shorter lengths, such as less than 8 ft. Thus, supports having larger lengths may require special shipping containers that increase the cost of shipping the supports.

The length of the supports may be limited by the strength thereof, as the supports must have sufficient strength to support the weight of the conduit and to resist bending tendencies of the conduit. Moreover, a support may collect moisture such as condensation or may not direct moisture as desired. This may be a particular concern if the support is used to support electrical conduit housing electrical wires or cables that are sensitive to moisture exposure.

In accordance with the present invention, a hangar and support assembly is provided that includes a support, a clamp, and a hanger. The support has a partial-cylindrical shape or body (e.g., a hemi-cylindrical body) including a first section having a first diameter and a second section having a second diameter. The clamp is configured to extend around the support and conduit placed in the support. The hanger is configured to suspend the conduit and the support.

In one embodiment, the support further includes a third section having a third diameter, and the first and third diameters are greater than the first diameter. In one aspect, the first and third sections being disposed at opposite ends of the support and are each configured to receive another support. This enables the support to serve as a coupler that joins two longer supports to one another to provide continuous support for the conduit. Since the coupler supports some length of the conduit, the coupler allows the supports joined by the support to be shortened to a convenient length for handling, installing, and shipping.

In another aspect, the support includes a retention member, such as a ring or a hook, extending radially from an outer surface thereof. The retention member defines an aperture for receiving a strap, such as a zip tie, which is configured to be wrapped around the support and the conduit to secure the conduit to the support. The retention member supports the strap during assembly, allowing the strap to be assembled using one hand while the other hand is used for balance to reduce the risk of injury. In addition, the retention member assists with determining the position and number of straps to be used for securing the conduit to the support.

In yet another aspect, the support includes longitudinal ribs or grooves extending along the length thereof. The longitudinal grooves increase the strength of the support, allowing the thickness of the support to be minimized. In yet another aspect, the partial-cylindrical body of the support defines an aperture in an apex thereof, and the longitudinal grooves direct moisture such as condensation to the aperture for drainage purposes.

In another embodiment, the second diameter is greater than the first diameter such that the second section can receive the first end of another one of the support. In this regard, multiple ones of the supports can be joined end-to-end, eliminating the need for a coupler. Methods for forming a support in accordance with the present invention are provided. Additional advantages and features of the present invention can be ascertained from the following description and claims as well as the appended drawings.

DRAWINGS

FIG. 1 is a perspective view of a support in accordance with the present invention;

FIG. 2 is an alternate perspective view of a portion of the support of FIG. 1;

FIG. 3 is a bottom view of the support of FIG. 1;

FIG. 4 is a cross-sectional view of the support of FIG. 1 taken along line 4-4 shown in FIG. 1;

FIG. 5 is a perspective view illustrating assembly of a constant-diameter support and the support of FIG. 1;

FIG. 7 is a perspective view of first alternative embodiment of a support in accordance with the present invention;

FIG. 8 is an alternate perspective view of a portion of the support of FIG. 7;

FIG. 13 is a perspective view of second alternative embodiment of a support in accordance with the present invention; and FIG. 14 is a section view of the support of FIG. 13 taken along line 14-14 shown in FIG. 13.

DETAILED DESCRIPTION

Figure 6:
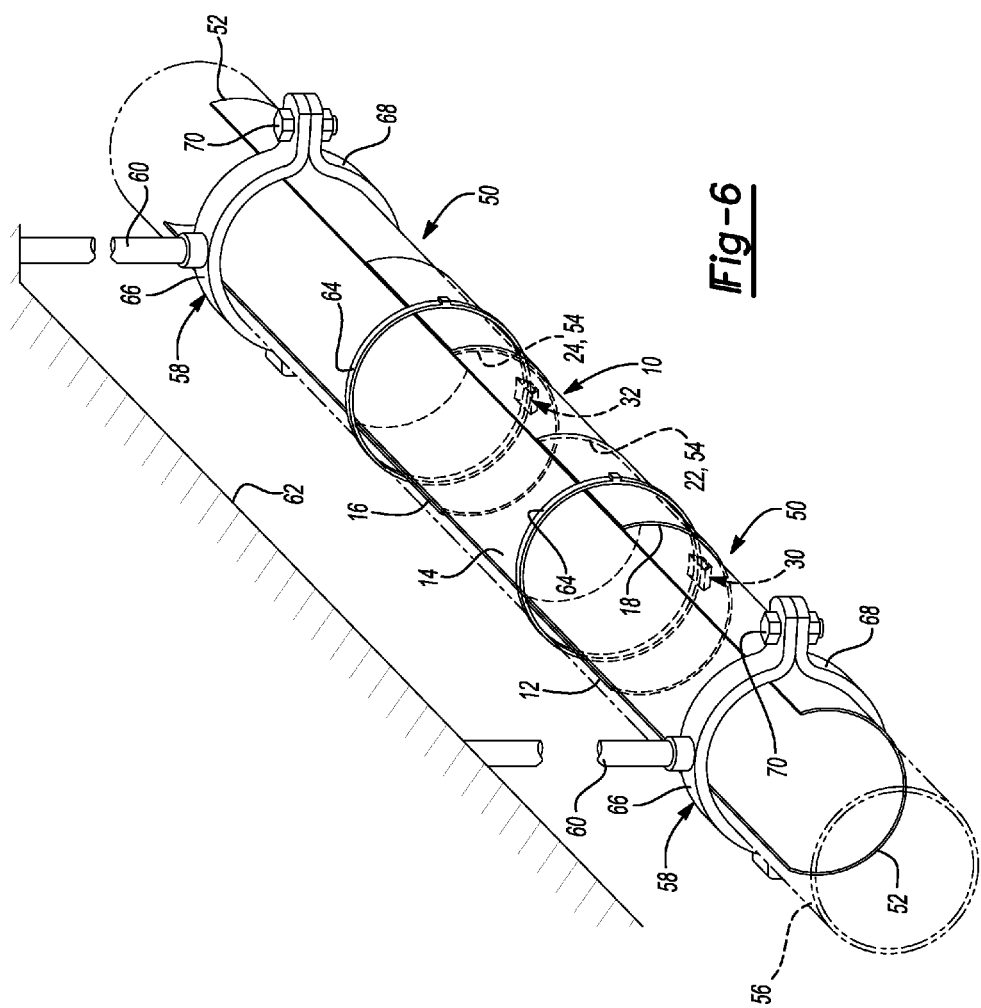
FIG. 6 is a perspective view illustrating a hanger and support assembly according to the principles of the present disclosure, the hanger and support assembly including the support of FIG. 1.
Figure 9:
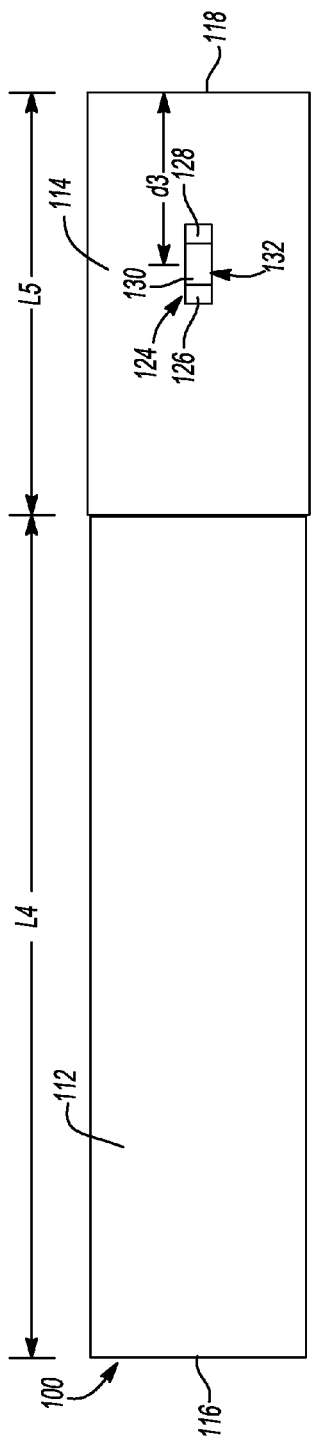
FIG. 9 is a bottom view of the support of FIG. 1.

Example embodiments will now be described more fully with reference to the accompanying drawings.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIGS. 1 through 4, a support 10 has a hollow, partial-cylindrical shape or body 11 and is configured to receive and support conduit such as electrical conduit or fluid pipe. In this regard, the support 10 may be referred to as a trough, channel, conduit reinforcement, or pipe reinforcement. The support 10 is also configured to couple one support to another support.

The support 10 includes a first portion or section 12, a second portion or section 14, and a third portion or section 16. The first and third sections 12 and 16 are disposed at first and second ends 18 and 20 of the support 10, and the second section 14 is disposed between the first and third sections 12 and 16. The first section 12 has an inner diameter D1, the second section 14 has an inner diameter D2, and the third section 16 has an inner diameter D3. In the embodiment shown, the inner diameter D1 is equal to the inner diameter D3, and the inner diameters D1 and D3 are greater than the inner diameter D2. In this regard, the first and second ends 18 and 20 may be referred to as flared ends.

The inner diameters D1, D2, and/or D3 may be selected based on the outer diameter of the conduit. For example, the inner diameters D1, D2, and/or D3 may be less than the outer diameter of the conduit to yield an interference fit between the conduit and the support 10. Alternatively, the inner diameters D1, D2, and/or D3 may be greater than or equal to the outer diameter of the conduit.

The first section 12 has a first length L1, the second section 14 has a second length L2, and the third section 16 has a third length L3. In the embodiment shown, the first, second, and third lengths L1, L2, and L3 are equal to each other. For example, the first, second, and third lengths L1, L2, and L3 may each be about four inches (in). In other embodiments, the first length L1, the second length L2, and/or the third length L3 are different from each other.

The first section 12 has a first thickness T1, the second section 14 has a second thickness T2, and the third section 16 has a third thickness T3. In the embodiment shown, the first, second, and third thicknesses T1, T2, and T3 are equal to each other. For example, the first, second, and third thicknesses T1, T2, and T3 may each be 0.032 in. In other embodiments, first thickness T1, the second thickness T2, and/or the third thickness T3 are different from each other The second section 14 includes a first shoulder 22 at the transition from the first section 12 to the second section 14 and a second shoulder 24 at the transition from the second section 14 to the third section 16. The thickness of the shoulder 22 is equal to the difference between the inner diameter D1 and the inner diameter D2. The thickness of the shoulder 24 is equal to the difference between the inner diameter D2 and the inner diameter D3.

The first section 12 defines a rectangular aperture 26 and the third section 16 defines a rectangular aperture 28. Moisture such as condensation that collects on the support 10 is allowed to drain through the apertures 26, 28. Thus, the apertures 26, 28 may be positioned at locations along the length of the support 10 where drainage is desired.

The first section 12 includes a retention member 30 positioned at the aperture 26 and the third section 16 includes a retention member 32 positioned at the aperture 28. The retention members 30, 32 are configured to position and retain a zip tie or strap, which can be used to secure the conduit to the support 10. As best shown in FIG. 2, the retention member 30 includes angled legs 34, 36 extending radially from an outer surface 37 of the hemispherical body 11 and a bridge 38 extending between the legs 34, 36. The legs 34, 36 and the bridge 38 cooperate to define an offset finger including an aperture 40 for receiving the strap. Similarly, the retention member 32 includes angled legs 42, 44 extending radially from the outer surface 37 of the hemispherical body 11 and a bridge 46 extending between the legs 42, 44. The legs 42, 44 and the bridge 46 cooperate to define an offset finger including an aperture 48 for receiving the strap. Although the retention members 30, 32 are depicted as closed loops or eyelets, the retention members 30, 32 may be partially-open loops or hooks.

In various embodiments, the apertures 40, 48 may be large enough to allow a toothed section of a zip tie to pass therethrough but small enough to prevent a head of the zip tie to pass therethrough. Thus, after inserting the zip tie through one of the apertures 40, 48, an installer may release the zip tie since the engagement between the head of the zip tie and the corresponding one of the retention members 30, 32 prevents the zip tie from falling. In turn, the installer may use one hand to wrap the zip tie around the conduit and the support 10 and to engage the toothed section with the head, leaving the other hand free for balancing or handling the conduit. In this manner, the retention members 30, 32 reduce the risk of injury.

The longitudinal center of the retention member 30 is positioned at a distance d1 from the first end 18, and the longitudinal center of the retention member 32 is positioned at a distance d2 from the second end 20. In the embodiment shown, the distances d1 and d2 are equal to each other. For example, the distances d1 and d2 may be about 1.5 in. In other embodiments, the distances d1 and d2 are different from each other.

Although the support 10 is depicted as including two retention members, the support 10 can include additional or fewer retention members. The retention members can be positioned at regular intervals along the length of the support 10 and/or at locations where securing the conduit to the support 10 is desired, which may be along the second section 14. The retention members 30, 32 can be positioned at the respective apexes of the partial-cylindrical first and third sections 12 and 16, as shown.

The support 10 can be formed from a sheet of material such as steel (e.g., stainless steel, G90 galvanized steel) and/or plastic using a process such as roll forming and/or stamping. In one example, the entire support 10 can be formed using a single stamping operation. In another example, the first, second, and third sections 12, 14, and 16 can be roll formed to have the same diameter, such as the diameter D2, and the retention members 30, 32 can be formed in the same roll forming operation. For example, a roll used to form the support 10 may include a projection for forming the retention members 30, 32. After the roll forming operation, the diameters of the first and third sections 12 and 16 can be increased using a stamping operation.

As best shown in FIG. 4, the outer perimeter of the support 10 extends through an angle A1. The angle A1 may be greater than 180 degrees to yield a snap fit between the conduit and the support 10. For example, the angle A1 may be approximately 220 degrees.

Referring to FIG. 5, a support 50 can be inserted through the first end 18 of the support 10. The support 50 has a hollow, partial-cylindrical shape or body 51 and is configured to receive and support the conduit. The support 50 also has a first end 52, a second end 54, and an inner diameter D4. The outer diameter of the support 50 can be less than or equal to the inner diameter D1 to facilitate insertion of the support 50 into the first section 12 of the support 10. In one example, the inner diameter D4 is equal to the inner diameter D2 of the second section 14 and the thickness of the support 50 is equal to the thickness of the second section 14 such that the outer diameter of the support 50 is equal to the outer diameter of the second section 14. In other examples, the inner diameter D4 is greater than or equal to the inner diameter D1. The support 50 can be slid into the support 10 until the second end 54 of the support 50 abuts the shoulder 22 of the support 10. The diameter D4 can be constant along the entire length of the support 50.

The support 50 can be inserted through the second end 20 of the support 10 in a similar manner. In this regard, the support 10 can be used to couple two of the supports 50 to each other. The length of the support 50 can be maximized to reduce the number of supports required to support a given length of conduit. To this end, the length of the support 50 can be significantly greater than the length of the support 10. For example, the length of the support 50 can be between 7 ft and 10 ft. Additionally, since the support 10 supports some length of the conduit, the length of the support 50 can be limited to a size that fits with standard shipping containers (e.g., 7 ft, 8 in) without increasing the number of supports 50 required.

Referring to FIG. 6, the support 10 is shown with two of the supports 50 inserted into the first and second ends 18 and 20 of the support 10, and conduit 56 is placed in the supports 10, 50. Clamps 58 are placed around the supports 50 and the conduit 56 with hangers 60 extending from the clamps 58 and suspending the supports 50 from structure 62 such as a ceiling. In addition, straps or zip ties 64 are inserted through the retention members 30, 32 and wrapped around the conduit 56 and the supports 10, 50. The clamps 58 and the zip ties 64 secure the conduit 56 to the supports 10, 50. In this regard, the clamps 58 and/or the zip ties 64 may be referred to as fasteners. The supports 10, 50, the clamps 58, the hangers 60, and the zip ties 64, or a sub-combination thereof, may be collectively referred to as a hanger and support assembly.

Before placing the conduit 56 in the support 10 and/or positioning the support 10 within the clamps 58, the zip ties 64 may be loosely preassembled to the support 10. This may be done by inserting the zip ties 64 through the retention members 30, 32, wrapping the zip ties 64 around the support 10, and engaging the toothed sections of the zip ties 64 and the head of the zip ties 64 without fully tightening the zip ties 64. This ensures that only one hand is required to secure lengths of the conduit 56 disposed between the clamps 58 and thereby further reduces the risk of injury.

The conduit 56 has a hollow, cylindrical shape and can be electrical conduit or fluid pipe. The conduit 56 has an outer diameter D5 and can be formed from plastic (e.g., PEC, PVC, CPVC, PE), metal, or other suitable materials. The supports 10, 50 can be sized to conform to the conduit 56. For example, the inner diameters D1, D2, D3, and/or D4 can be less than the outer diameter D5 to yield an interference fit between the conduit 56 and the supports 10, 50.

The clamps 58 are configured to secure the conduit 56 to the supports 50. In this regard, the clamps 58 each include a top member 66, a bottom member 68, and fasteners 70, such as screws and nuts, joining the top and bottom members 66 and 68. The fasteners 70 can be inserted through corresponding holes in the top and bottom members 66, 68. The top and bottom members 66, 68 can cooperate to form a ring. The inner diameter of this ring can be less than or equal to the outer diameter of the supports 50 such that the clamps 58 press the supports 50 and the conduit 56 together and prevent longitudinal movement thereof.

The hangers 60 can be threaded rod that is inserted into a corresponding hole in the top member 66 having female threads corresponding to the threads on the hangers 60. The clamps 58 and the hangers 60 may collectively be referred to as clamps or as hangers. Although described above as rings, the clamps 58 can have other shapes such as rectangular or U-shaped. Other examples of clamps 58 are provided in U.S. Pat. Nos. 6,282,756 and 7,490,388, which are incorporated by reference herein in their entirety.

Referring to FIGS. 7 through 10, a support 100 has a hollow, partial-cylindrical shape or body 101 and is configured to receive and support conduit such as electrical conduit or fluid pipe. To this end, the support 100 may be referred to as a trough, channel, conduit reinforcement, or pipe reinforcement. In addition, two or more of the supports 100 may be assembled end-to-end, eliminating the need for a coupler to join the supports 100 to each other.

The support 100 includes a first portion or section 112 and a second portion or section 114. The first section 112 extends from a first end 116 of the support 100 to the second section 114, and the second section 114 extends from the first section 112 to a second end 118 of the support 100. The first section 112 has an inner diameter D5 and the second section 114 has an inner diameter D6. In the embodiment shown, the inner diameter D6 is greater than the inner diameter D5 of the second section 114. In this regard, the second end 118 may be referred to as a flared end. Thus, in contrast to the support 10 which has dual flared ends, the support 100 has a single flared end.

The inner diameters D5 and/or D6 may be selected based on the outer diameter of the conduit. For example, the inner diameters D5 and/or D6 may be less than the outer diameter of the conduit to yield an interference fit between the conduit and the support 100. Alternatively, the inner diameters D5 and/or D6 may be greater than or equal to the outer diameter of the conduit.

The first section 112 has a first length L4 and the second section 114 has a second length L5. In the embodiment shown, the first length L4 is greater than the second length L5. For example, the first length L4 may be about 104 inches, and the second length L5 may be about 4 inches. In other examples, the first length L4 may be less than or equal to the second length L5.

The first section 112 has a first thickness T4 and the second section 114 has a second thickness T5. In the embodiment shown, the first and second thicknesses T4 and T5 are equal to each other. For example, the first and second thicknesses T4 and T5 may each be about 0.032 in. In other embodiments, first and second thicknesses T4 and T5 are different from each other. The first section 112 includes a shoulder 120 at the transition from the first section 112 to the second section 114. The thickness of the shoulder 120 is equal to the difference between the inner diameter D4 and the inner diameter D5.

The second section 114 defines a rectangular aperture 122. Moisture such as condensation that collects on the support 100 is allowed to drain through the aperture 122. Thus, the aperture 122 may be located along the length of the support 100 where drainage is desired.

The second section 114 includes a retention member 124 positioned at the aperture 122. The retention member 124 is configured to position and retain a zip tie or strap, which can be used to secure the conduit to the support 100. As best shown in FIG. 8, the retention member 124 includes angled legs 126, 128 extending radially from an outer surface 129 of the partial-cylindrical body 101 and a bridge 130 extending between the 126, 128. The legs 126, 128 and the bridge 130 cooperate to define an offset finger including an aperture 132 for receiving the strap. Although the retention member 124 is depicted as a closed loop or eyelet, the retention member 124 may be a partially-open loop or hook.

In various embodiments, the aperture 122 may be large enough to allow a toothed section of a zip tie to pass therethrough but small enough to prevent a head of the zip tie to pass therethrough. Thus, after inserting the zip tie through the aperture 122, an installer may release the zip tie since the engagement between the head of the zip tie and the retention member 124 holds the zip tie in place. In turn, the installer may use one hand to wrap the zip tie around the conduit and the support 100 and to engage the toothed section with the head, leaving the other hand free for balancing or handling the conduit. In this manner, the retention member 124 reduces the risk of injury.

The longitudinal center of the retention member 124 is positioned at a distance d3 from the second end 118. In the embodiment shown, the distance d3 is less than one-half of the length L5 of the second section 114. In one example, the distance d3 may be about 1.6 in. In other embodiments, the distance d3 may be greater than or equal to one-half of the length L5.

Although the support 100 is depicted as including a single retention member, the support 100 can include additional retention members. The retention members can be positions at regular intervals along the length of the support 100 and/or at locations where securing the conduit to the support 100 is desired. In one example, the first section 112 may include a retention member similar to the retention member 124. The retention member 124 can be positioned at the apex of the partial-cylindrical second section 114, as shown.

The support 100 can be formed from a sheet of material such as steel (e.g., stainless steel, G90 galvanized steel) and/or plastic using a process such as roll forming and/or stamping. In one example, the entire support 100 can be formed using a single stamping operation. In another example, the first and second sections 112 and 114 can be roll formed to have the same diameter, such as the diameter D4, and the retention member 124 can be formed in the same roll forming operation. For example, a roll used to form the support 100 may include a projection for forming the retention member 124. After the roll forming operation, the diameters of the second section 114 can be increased using a stamping operation.

Figure 10:
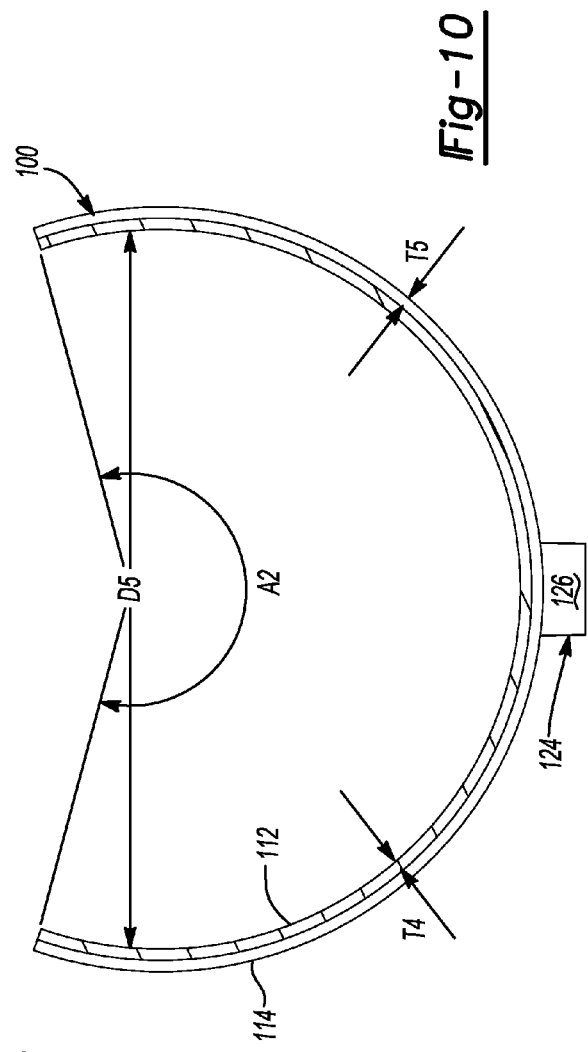
FIG. 10 is a cross-sectional view of the support of FIG. 7 taken along line 10-10 shown in FIG. 7.

As best shown in FIG. 10, the outer perimeter of the support 100 extends through an angle A2. The angle A2 may be greater than 180 degrees to yield a snap fit between the conduit and the support 100. For example, the angle A2 may be approximately 220 degrees.

Figure 11:
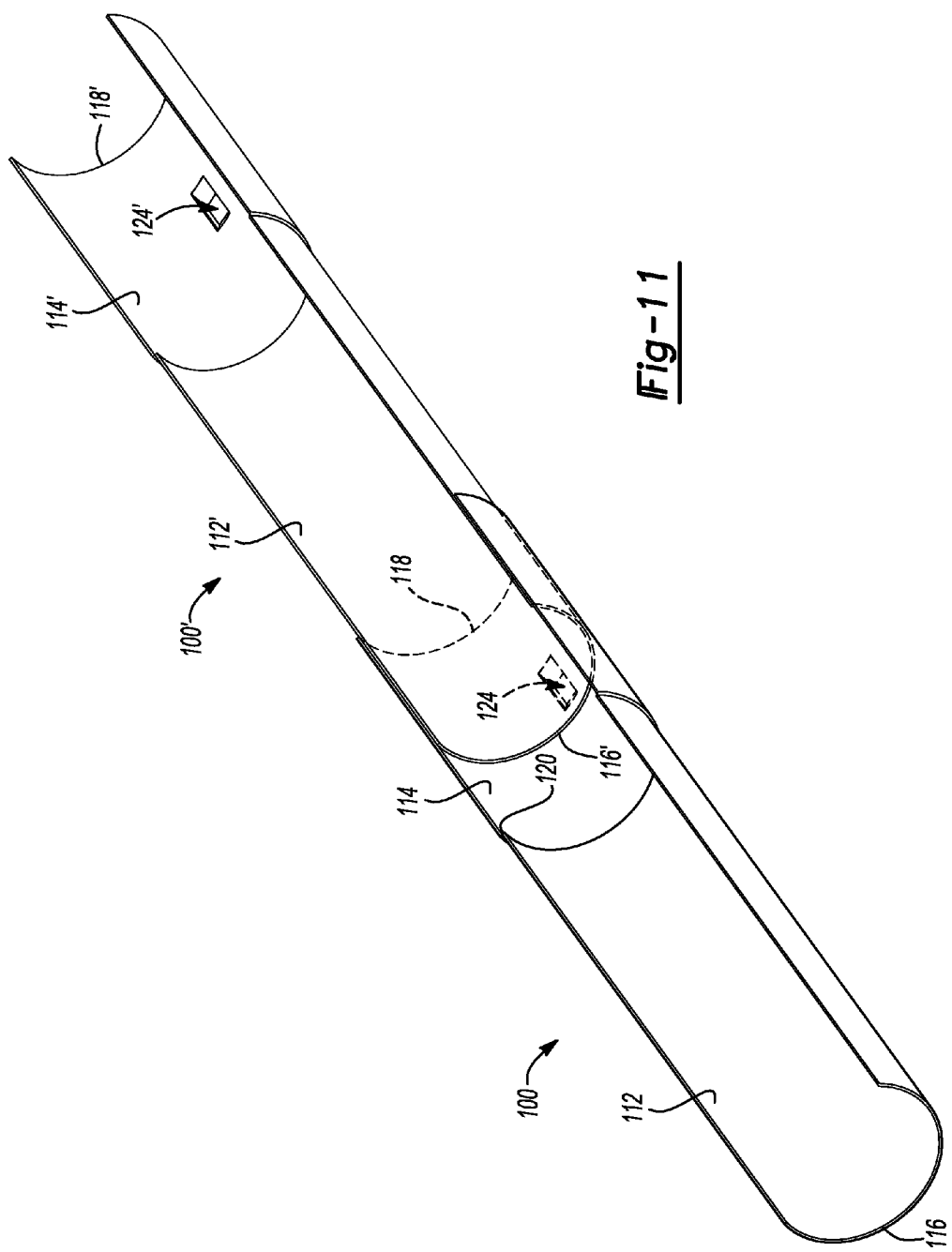
FIG. 11 is a perspective view illustrating assembly of two of the supports of FIG. 7.

Referring to FIG. 11, the support 100 and a support 100' that is identical to the support 100 are shown assembled end-to-end. A first end 116' of the support 100' is inserted through the second end 118 of the support 100. The support 100' can be slid into the support 100 until the first end 116' of the support 100' abuts the shoulder 120 of the support 100. Additional ones of the support 100 can be assembled in this manner until the collective length of the supports 100 is equal to the length of conduit to be supported.

Figure 12:
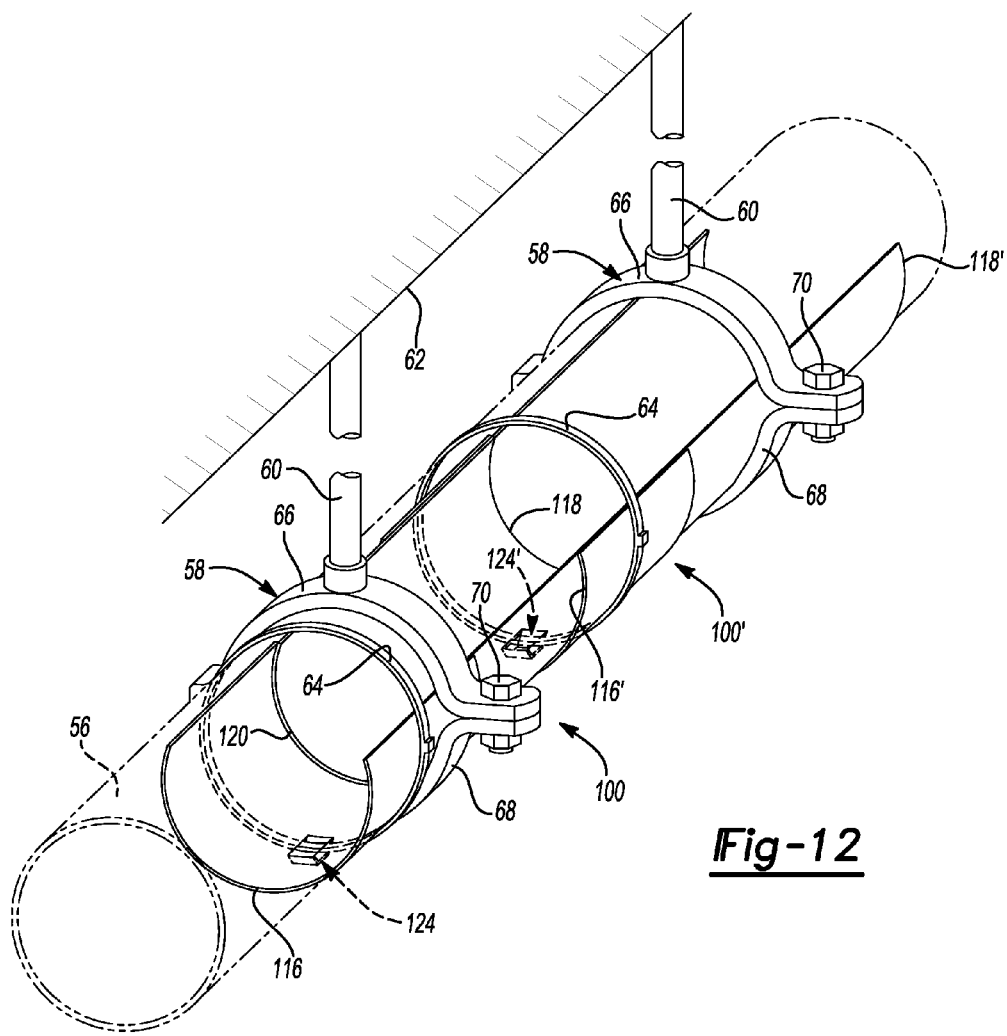
FIG. 12 is a perspective view illustrating a hanger and support assembly in accordance with the present invention, the hanger and support assembly including two of the supports of FIG. 7.

Referring to FIG. 12, the supports 100, 100' are shown assembled end to end with the conduit 56 placed in the supports 100, 100'. The clamps 58 are placed around the supports 100, 100' and the conduit 56 with the hangers 60 extending from the clamps 58 and suspending the supports 100, 100' from the structure 62. In addition, the straps or zip ties 64 are inserted through the retention members 124, 124' and wrapped around the conduit 56 and the supports 100, 100'.

The supports 100, 100', the clamps 58, the hangers 60, and the zip ties 64, or a sub-combination thereof, may be collectively referred to as a hanger and support assembly. Before placing the conduit 56 in the supports 100, 100' and/or positioning the supports 100, 100' within the clamps 58, the zip ties 64 may be loosely preassembled to the supports 100, 100'. This may be done by inserting the zip ties 64 through the retention members 124, 124', wrapping the zip ties 64 around the supports 100, 100', and engaging the toothed sections of the zip ties 64 and the head of the zip ties 64 without fully tightening the zip ties 64. This ensures that only one hand is required to secure lengths of the conduit 56 disposed between the clamps 58 and thereby further reduces the risk of injury.

Referring to FIGS. 13 and 14, a support 150 is similar to the support 100 and further includes longitudinal ribs or grooves 152 extending along the length thereof. The cross-section of the longitudinal grooves 152 may be triangular, trapezoidal, rectangular, or semicircular as shown. The longitudinal grooves 152 strengthen the support 150, which enables the support 150 to support heavier conduit without increasing the thickness of the support 150. In addition, the longitudinal grooves 152 direct moisture, such as condensation, along the length of the support. In various implementations, the support 150 may define one or more apertures, such as the aperture 122, and the longitudinal grooves 152 may direct moisture to the aperture to drain the moisture from the support 150.

Although three longitudinal grooves are shown, the support 150 can include additional or fewer longitudinal grooves. In addition, although the longitudinal grooves 152 are shown included in a support having a single flared end, the longitudinal grooves 152 may be included in a support have dual flared ends such as the support 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A support assembly for supporting a conduit, the support assembly comprising:
 a first support having a partial-cylindrical shape configured to receive and support a first portion of the conduit, the partial-cylindrical shape including a first section, a second section, and a third section, the first section having a first inner diameter, the second section having a second inner diameter that is greater than the first inner diameter, and the third section having a third inner diameter that is greater than the first inner diameter, wherein the first section is disposed between the second section and the third section; and
 a rigid second support configured to be inserted into either one of the second section and the third section wherein, when the second support is inserted into either one of the second and third sections, the second support extends beyond an end of the first support to support a second portion of the conduit that is different from the first portion.

2. The support assembly of claim 1, wherein the second support has a fourth inner diameter that is constant along its entire length.

3. The support assembly of claim 1, wherein the first support includes a retention member extending radially from an outer surface of the partial-cylindrical shape.

4. The support assembly of claim 1, further comprising a fastener configured to secure the conduit to the first support.

5. The support assembly of claim 1, further comprising a hanger configured to suspend the first support.

6. The support assembly of claim 1, wherein the third inner diameter is equal to the second inner diameter.

7. The support assembly of claim 1, wherein at least one of the first inner diameter, the second inner diameter, and the third inner diameter is configured to be less than an outer diameter of the conduit.

8. The support assembly of claim 1, wherein the first section has a first length, the second section has a second length, and the third section has a third length that is equal to each of the first length and the second length.

9. The support assembly of claim 1, further comprising a third support configured to be inserted into either one of the second section and the third section, wherein the first support is configured to couple the second and third supports together.

10. A support assembly for supporting a conduit, the support assembly comprising:
 a first support having a partial-cylindrical shape configured to receive and support a first portion of the conduit, the partial-cylindrical shape including a first section and a second section; and
 a second support having a partial-cylindrical shape configured to receive and support a second portion of the conduit that is different than the first portion of the conduit, the partial-cylindrical shape including a first section and a second section wherein the first section of one of the first and second supports is configured to be inserted into the second section of the other one of the first and second supports and, before the first and second supports are assembled together, the first sections of the first and second supports have a first inner diameter and the second sections of the first and second support have a second inner diameter that is greater than the second inner diameter.

11. The support assembly of claim 10, further comprising a retention member extending radially from an outer surface of the partial-cylindrical shape of the first support.

12. The support assembly of claim 11, wherein the retention member includes one of a closed loop and a partially-open loop that defines an aperture for receiving a strap to secure the conduit to the first support.

13. The support assembly of claim 12, wherein the aperture is sized to allow a toothed section of a zip tie to pass therethrough while preventing a head of the zip tie from passing therethrough.

14. The support assembly of claim 10, wherein the first section of the first support has a first length and the second section of the first support has a second length that is less than the first length.

15. The support assembly of claim 10, wherein the first section of the first support has an outer diameter that is less than or equal to the second inner diameter of the second section of the first support.

16. The support assembly of claim 10, wherein the partial-cylindrical shape of the first support extends through an angle that is greater than 180 degrees.

17. The support assembly of claim 10, wherein first support consists of its respective first and second sections and the second support consists of its respective first and second sections.

18. A support assembly for supporting a conduit, the support assembly comprising:
 a partial-cylindrical channel including a first portion and a second portion, the first portion extending along the length of the channel from a first end of the channel to the second portion and having a first diameter, the second portion extending along the length of the channel from the first portion to a second end of the channel and having a second diameter that is greater than the first diameter when the channel is initially formed, at least one of the first portion and the second portion including a bracket extending radially from an outer surface of the partial-cylindrical channel, the bracket including an offset finger that includes a hole;
 a fastener configured to extend around the conduit and through the hole in the bracket to secure the conduit to the channel; and
 a hanger configured to suspend the fastener and the channel from a structure.

19. The support assembly of claim 18, wherein the channel includes longitudinal grooves extending along a length thereof.

20. The support assembly of claim 18, wherein the offset finger forms a closed loop.

21. The support assembly of claim 18, wherein the offset finger forms a partially-open loop.

22. The support assembly of claim 18, wherein the partial-cylindrical channel is metallic.

* * * * *